US010742731B2

(12) United States Patent
Brown et al.

(10) Patent No.: US 10,742,731 B2
(45) Date of Patent: Aug. 11, 2020

(54) MAINTAINING SERVICE CONFIGURATION CONSISTENCY ACROSS NODES OF A CLUSTERED FILE SYSTEM

(71) Applicant: International Business Machines Corporation, Armonk, NY (US)

(72) Inventors: William B. Brown, Austin, TX (US); Poornima Gupte, Pune (IN); Frank Marschollek, Mainz (DE); Lance W. Russell, Rosanky, TX (US); Rainer Wolafka, Mainz (DE); Rong Zeng, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 388 days.

(21) Appl. No.: 14/735,685

(22) Filed: Jun. 10, 2015

(65) Prior Publication Data
US 2016/0366215 A1 Dec. 15, 2016

(51) Int. Cl.
*H04L 29/08* (2006.01)
*G06F 17/30* (2006.01)
*G06F 16/182* (2019.01)

(52) U.S. Cl.
CPC ........ *H04L 67/1095* (2013.01); *G06F 16/183* (2019.01); *H04L 67/06* (2013.01)

(58) Field of Classification Search
CPC .... H04L 67/1095; H04L 67/06; G06F 16/183
See application file for complete search history.

(56) References Cited

U.S. PATENT DOCUMENTS

| 6,748,429 B1* | 6/2004 | Talluri ................. G06F 9/5061 709/221 |
|---|---|---|
| 7,028,225 B2 | 4/2006 | Maso et al. |
| 7,228,369 B2 | 6/2007 | Nakamura |
| 7,392,421 B1* | 6/2008 | Bloomstein ......... G06F 11/1482 714/4.4 |
| 7,403,945 B2 | 7/2008 | Lin et al. |
| 7,406,473 B1 | 7/2008 | Brassow et al. |
| 7,627,617 B2 | 12/2009 | Kavuri et al. |
| 7,779,425 B2 | 8/2010 | Pudipeddi et al. |

(Continued)

FOREIGN PATENT DOCUMENTS

| EP | 000798656 A2 | 10/1997 |
|---|---|---|
| EP | 1578088 A2 | 9/2005 |

(Continued)

OTHER PUBLICATIONS

Chavis, Ira, et al. A Guide to the IBM Clustered Network File System. IBM Redbooks, 2012. (Year: 2012).*

(Continued)

*Primary Examiner* — Usmaan Saeed
*Assistant Examiner* — William P Bartlett
(74) *Attorney, Agent, or Firm* — Zilka-Kotab, P.C.

(57) ABSTRACT

A computer program product is provided for extending a clustered file system. The computer program product comprises a computer readable storage medium having program instructions embodied therewith. The program instructions are executable by a processor to cause the processor to build a central cluster repository, establish a service-specific interface for accessing non-file system data in the central cluster repository, and extend a clustered file system with the service-specific interface.

16 Claims, 6 Drawing Sheets

(56) References Cited

U.S. PATENT DOCUMENTS

| | | | |
|---|---|---|---|
| 7,783,610 | B2 | 8/2010 | Lin et al. |
| 7,958,385 | B1* | 6/2011 | Frangioso ............ G06F 11/2025 |
| | | | 709/223 |
| 8,266,111 | B2 | 9/2012 | Lin et al. |
| 8,392,378 | B2 | 3/2013 | Pafumi et al. |
| 8,417,681 | B1 | 4/2013 | Miloushev et al. |
| 8,769,100 | B2 | 7/2014 | Yao |
| 8,892,833 | B2 | 11/2014 | Smith et al. |
| 8,983,899 | B1 | 3/2015 | Ghait et al. |
| 9,141,435 | B2 | 9/2015 | Wein |
| 9,152,666 | B2 | 10/2015 | Lin et al. |
| 9,390,055 | B2 | 7/2016 | Warfield et al. |
| 9,626,411 | B1 | 4/2017 | Chang et al. |
| 9,940,213 | B2 | 4/2018 | Brown et al. |
| 10,592,373 | B2 | 3/2020 | Brown et al. |
| 2002/0103729 | A1 | 8/2002 | Young et al. |
| 2003/0149735 | A1 | 8/2003 | Stark et al. |
| 2004/0243673 | A1 | 12/2004 | Goyal et al. |
| 2005/0240943 | A1 | 10/2005 | Smith et al. |
| 2005/0246716 | A1 | 11/2005 | Smith et al. |
| 2006/0004796 | A1* | 1/2006 | Nakamura .............. G06F 3/061 |
| 2006/0101081 | A1 | 5/2006 | Lin et al. |
| 2006/0136460 | A1 | 6/2006 | Pudipeddi et al. |
| 2007/0156789 | A1 | 7/2007 | Semerdzhiev et al. |
| 2009/0037367 | A1 | 2/2009 | Wein |
| 2010/0082774 | A1 | 4/2010 | Pitts |
| 2010/0125844 | A1* | 5/2010 | Mousseau ................ G06F 9/50 |
| | | | 718/1 |
| 2011/0238842 | A1 | 9/2011 | Massa et al. |
| 2011/0289417 | A1 | 11/2011 | Schaefer et al. |
| 2012/0072596 | A1 | 3/2012 | Kruse et al. |
| 2012/0150815 | A1* | 6/2012 | Pafumi ............... G06F 11/1658 |
| | | | 707/679 |
| 2012/0303686 | A1 | 11/2012 | Ananthanarayanan et al. |
| 2013/0080559 | A1 | 3/2013 | Rao et al. |
| 2013/0205063 | A1* | 8/2013 | Zhang ................ G06F 11/1415 |
| | | | 711/102 |
| 2013/0290249 | A1 | 10/2013 | Merriman et al. |
| 2014/0025770 | A1 | 1/2014 | Warfield et al. |
| 2015/0120928 | A1* | 4/2015 | Gummaraju ........ H04L 67/1008 |
| | | | 709/226 |
| 2015/0333992 | A1* | 11/2015 | Vasseur ............... H04L 12/4633 |
| | | | 370/252 |
| 2015/0339333 | A1 | 11/2015 | Pudipeddi et al. |
| 2015/0370502 | A1 | 12/2015 | Aron et al. |
| 2016/0092463 | A1* | 3/2016 | Vijayan ................. G06F 17/302 |
| | | | 707/626 |
| 2016/0323237 | A1 | 11/2016 | Warfield et al. |
| 2016/0364406 | A1 | 12/2016 | Brown et al. |
| 2016/0378450 | A1 | 12/2016 | Fu et al. |
| 2017/0026378 | A1 | 1/2017 | Beck |
| 2017/0212686 | A1 | 7/2017 | Moore et al. |
| 2018/0157570 | A1 | 6/2018 | Brown et al. |

FOREIGN PATENT DOCUMENTS

| | | |
|---|---|---|
| EP | 001918836 A1 | 5/2008 |
| EP | 002780836 A1 | 9/2014 |
| WO | 2008134527 A1 | 11/2008 |

OTHER PUBLICATIONS

Non-Final Office Action from U.S. Appl. No. 14/735,821, dated Jun. 22, 2017.

Brown et al., U.S. Appl. No. 14/735,821, filed Jun. 10, 2015.

List of IBM Patents or Patent Applications Treated as Related.

Pourzandi et al., "Clusters and security: distributed security for distributed systems," In Cluster Computing and the Grid, vol. 1, 2005, pp. 96-104.

Nagle et al., "The panasas activescale storage cluster: Delivering scalable high bandwidth storage," In Proceedings of the 2004 ACM/IEEE conference on Supercomputing, 2004, pp. 1-10.

Flouris et al, "Extensible block-level storage virtualization in cluster-based systems," Journal of Parallel and Distributed Computing, vol. 70, No. 8, 2010, pp. 800-824.

Flouris et al, "Orchestra: Extensible block-level support for resource and data sharing in networked storage systems," ICPADS'08 14th IEEE International Conference, 2008, pp. 237-244.

Notice of Allowance from U.S. Appl. No. 14/735,821, dated Dec. 5, 2017.

Brown et al., U.S. Appl. No. 15/890,228, filed Feb. 6, 2018.

Non-Final Office Action from U.S. Appl. No. 15/890,228, dated Oct. 4, 2018.

Final Office Action from U.S. Appl. No. 15/890,228, dated Mar. 14, 2019.

Non-Final Office Action from U.S. Appl. No. 15/890,228, dated Jun. 13, 2019.

Advisory Action from U.S. Appl. No. 15/890,228, dated May 23, 2019.

Notice of Allowance from U.S. Appl. No. 15/890,228, dated Nov. 4, 2019.

* cited by examiner

MAINTAINING SERVICE CONFIGURATION CONSISTENCY ACROSS NODES OF A CLUSTERED FILE SYSTEM

BACKGROUND

The present invention relates to clustered file systems, and, more particularly, this invention relates to maintaining synchronicity between services running on nodes of a cluster.

Clustered file systems provide a powerful homogenous view and access to diverse sources of storage. However, a major drawback to these systems is that the easiest and most direct method for a user to access the file system data is from a node that is a direct member of the file system cluster. To relax this constraint, services have been implemented on top of clustered file systems that export or externalize the clustered file system data. Examples of such services include Network File System (NFS), Server Message Block (SMB), and OpenStack, each of which may export the clustered file system. Users may then access the data from any computer system implementing these ubiquitous protocols.

For reasons associated with availability and performance, it may be desirable for these external services to run simultaneously on all nodes of the clustered file system. Further, these external services, in large part, may be implemented independent of the clustered file system. Consequently, each of the external services must be configured on each node of the clustered file system on which it executes. This may require that any necessary configuration files be installed on all relevant nodes of the cluster. Additionally, if changes occur to any of the configuration files, such changes may need to be propagated and activated on all relevant nodes.

Moreover, the configuration files for an external service may define base operating parameters of the service, such as how much memory the external service consumes, how many threads the external service consumes, etc. The configuration files for an external service also may define base functionality of the external service, such as which files are exported, and to which clients the external service exports. Any inconsistencies between the configuration files of a cluster may lead to inconsistences in the external service.

Finally, external services may not include the functionality required to keep configuration consistent across a clustered file system. Accordingly, it may be the responsibility of a system administrator to manually maintain consistency, or to automate such actions in a way that is independent of the clustered file system. This may lead to problems of usability and maintainability. For example, tasks such as disaster recovery, where the administrator must initiate the backup and restoration of the clustered file system and each external service, become exceedingly difficult, if not impossible.

BRIEF SUMMARY

In one embodiment, a computer program product is provided for extending a clustered file system. The computer program product comprises a computer readable storage medium having program instructions embodied therewith. The program instructions are executable by a processor to cause the processor to build a central cluster repository, establish a service-specific interface for accessing non-file system data in the central cluster repository, and extend a clustered file system with the service-specific interface.

Other aspects and embodiments of the present invention will become apparent from the following detailed description, which, when taken in conjunction with the drawings, illustrate by way of example the principles of the invention.

DETAILED DESCRIPTION

Figure 1:
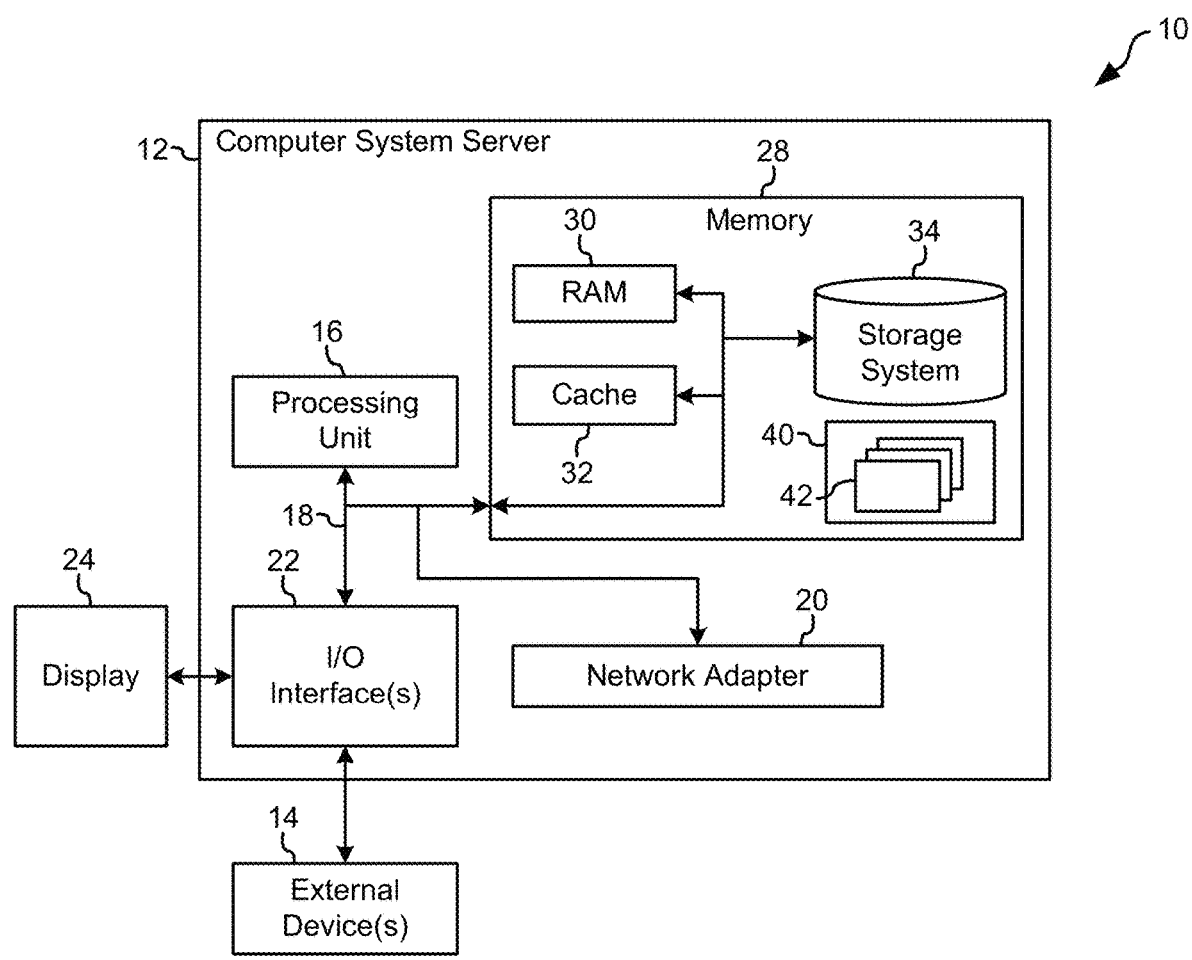
FIG. 1 depicts a cloud computing node according to an embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments for extending a clustered file system to provide a central cluster repository that stores non-file system data.

In one general embodiment, a computer program product is provided for extending a clustered file system. The computer program product comprises a computer readable storage medium having program instructions embodied therewith. The program instructions are executable by a processor to cause the processor to build a central cluster repository, establish a service-specific interface for accessing non-file system data in the central cluster repository, and extend a clustered file system with the service-specific interface.

In another general embodiment, a computer program product is provided for propagating non-file system data. The computer program product comprises a computer readable storage medium having program instructions embodied therewith. The program instructions are executable by a processor to cause the processor to receive non-file system data associated with an external service, store the non-file system data in a central cluster repository of a clustered file system, and propagate the non-file system data to all nodes of a sub-cluster of nodes of the clustered file system that are eligible to run the external service.

In another general embodiment, a system comprises a processor and logic integrated with and/or executable by the processor. The logic is configured to receive non-file system data associated with an external service, store the non-file system data in a central cluster repository of a clustered file system, and propagate the non-file system data to all nodes of a sub-cluster of nodes of the clustered file system that are eligible to run the external service.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
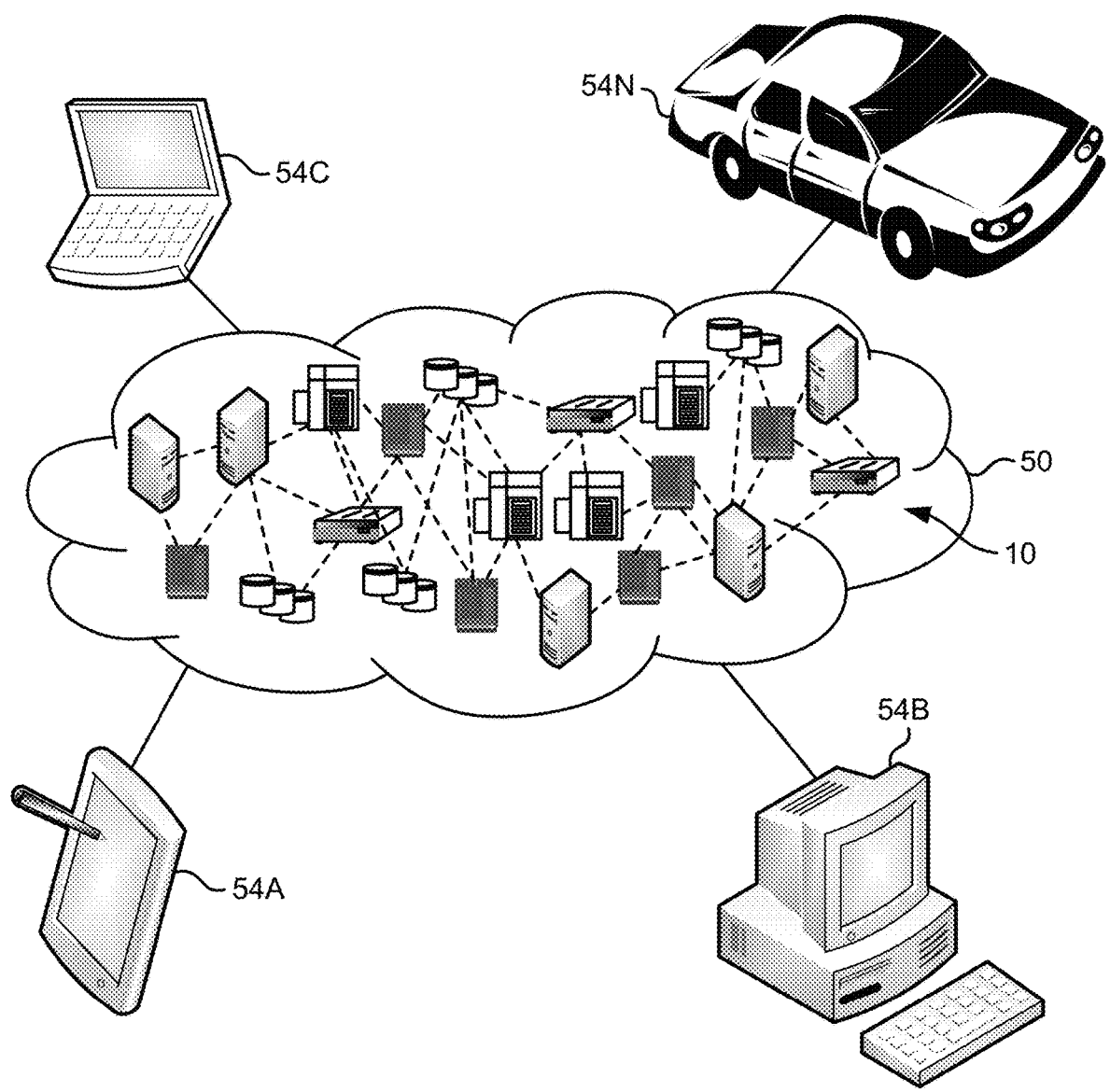
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer MB, laptop computer MC, and/or automobile computer system MN may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
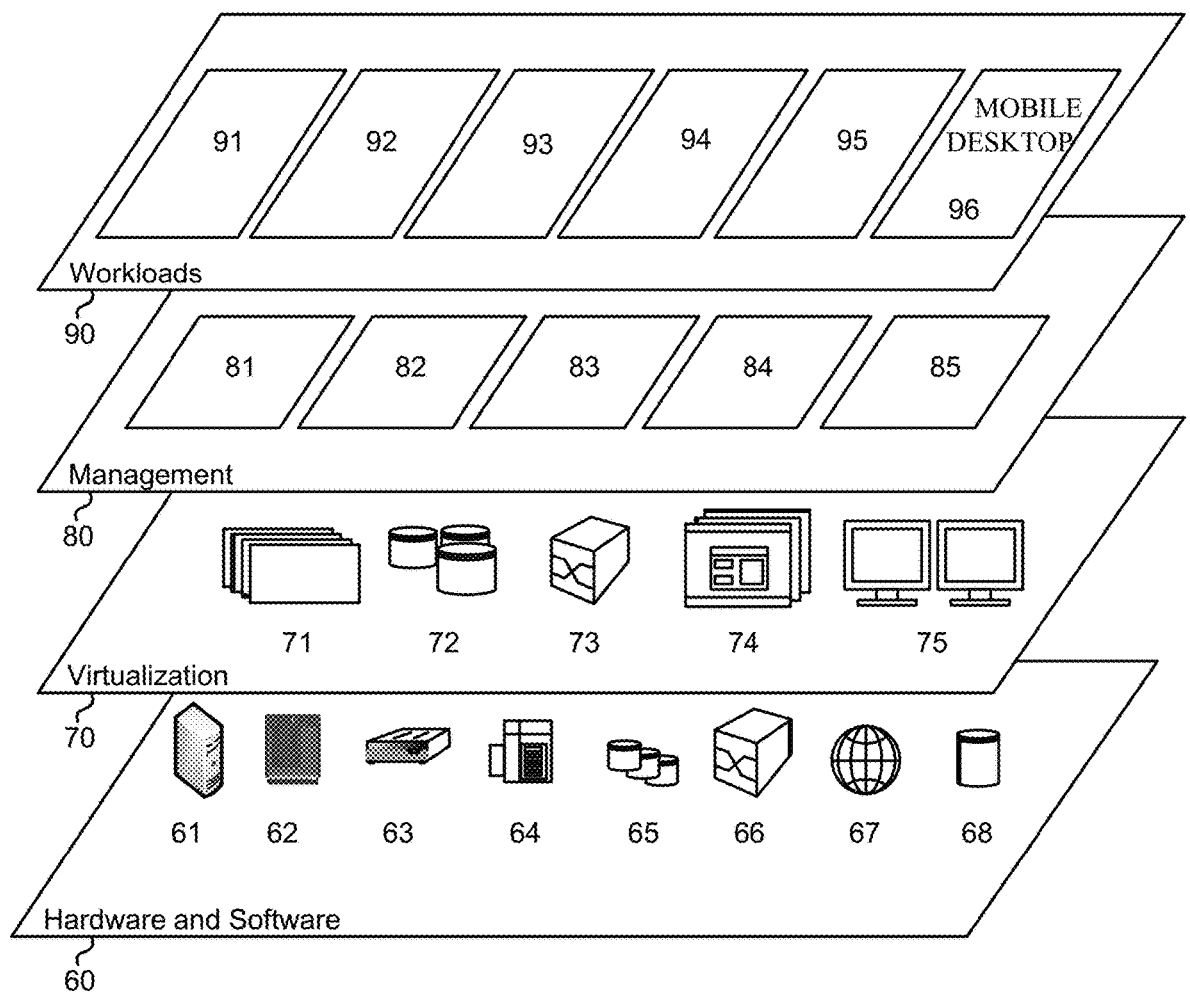
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

The management layer 80 may also provide functionality for maintaining service configuration consistency across nodes of a clustered file system.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Figure 4:
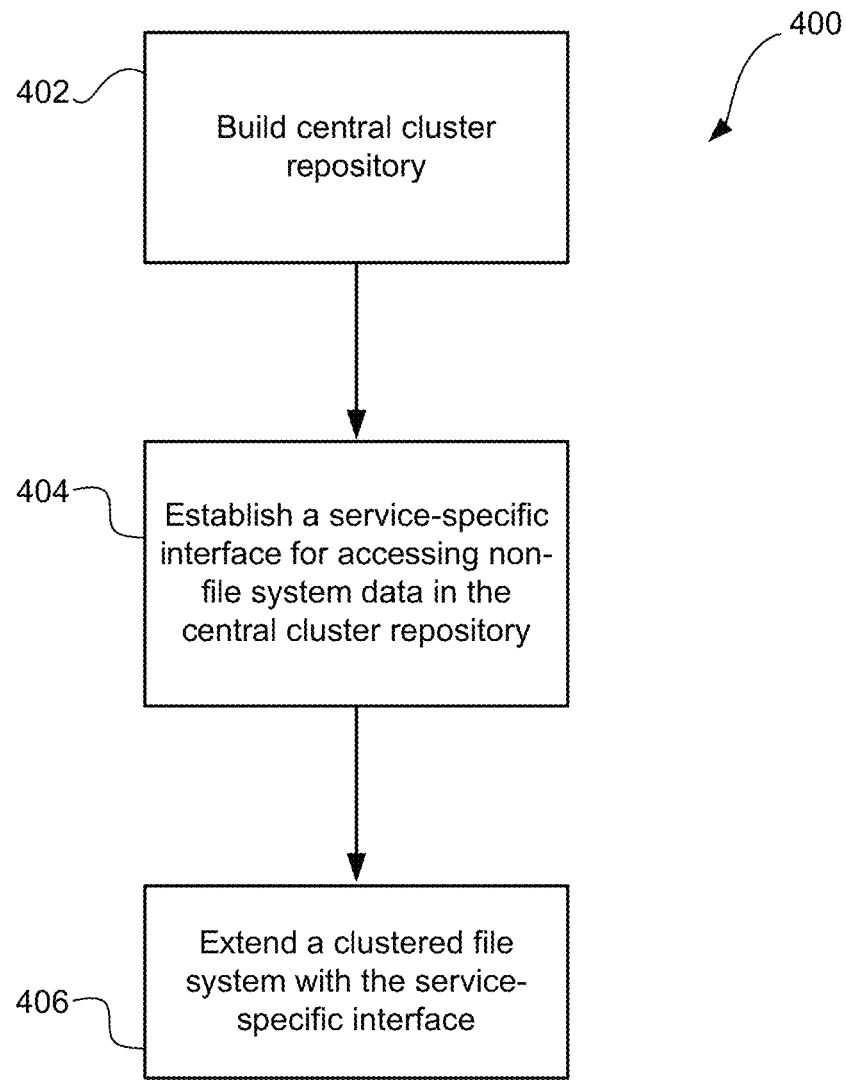
FIG. 4 illustrates a method for extending a clustered file system with a service-specific interface, in accordance with one embodiment.

Now referring to FIG. 4, a flowchart of a method 400, for extending a clustered file system with a service-specific interface, is shown according to one embodiment. The method 400 may be performed in accordance with the present invention in any of the environments depicted in FIGS. 1-3, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a data server or user device, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

At operation 402, a central cluster repository is built. As used herein, the central cluster repository includes any assembly of cluster configuration data that may be used for configuring and/or managing a cluster. The central cluster repository may be stored on one or more disks. Further, the central cluster repository may be accessible to all nodes in a cluster.

In one embodiment, the central cluster repository may be built by a clustered file system. Further, the central cluster repository may be maintained by the clustered file system. In this manner, the central cluster repository may be backed up with the clustered file system during backup operations, and/or the central cluster repository may be restored with the clustered file system during restore operations, such as operations that restore from previous backups of the clustered file system.

Further, as shown at operation 404, a service-specific interface is established for accessing non-file system data in the central cluster repository. The service-specific interface may store and retrieve the non-file system data from the central cluster repository. As used herein, a service-specific interface includes any interface that is specific for an external service; and an interface may include any software and/or hardware that enables communication between the central cluster repository and another entity, such as a node or external service.

An external service may include any executing process, not part of the clustered file system, which allows devices that are not members of the clustered file system to view and manipulate data that is in the cluster. External services may include network applications and protocols, such as Network File System (NFS), Server Message Block (SMB), OpenStack, and iSCSI, each of which may export the clustered file system.

In one embodiment, a cluster may include servers that offer services to clients, and the clients access the services by connecting to one or more IP addresses that are exported by nodes of the cluster. In such an embodiment, the clients may connect to nodes via the external services.

The clients may include Network File System (NFS) clients, Server Message Block (SMB) clients, OpenStack clients, etc., that connect to the respective service (e.g., NFS service, SMB service, OpenStack service, respectively) offered by a node at an exported IP address. For example, a SMB client may connect to the IP address for read/write access of the clustered file system using a SMB service of the node.

As used herein, non-file system data may include any data stored to the central cluster repository that is not file system data. The non-file system data may include configuration data, such as configuration data for one or more external services.

Accordingly, a service-specific interface may be utilized by a node to obtain configuration data specific for one or more external services. For example, a node may store and/or retrieve NFS configuration data to/from the central cluster repository using an NFS-specific interface. Similarly, the node may store and/or retrieve SMB configuration data to/from the central cluster repository using an SMB-specific interface.

In one embodiment, different external services may require different configuration data. For example, a given external service may require a list of exports that identifies the files to be exported by the external service. As another example, a given external service may require tuning parameters, such as how many threads the external service may use. Still yet, a given external service may require the identification of a security method that is applied during access of the clustered file system using the external service. Additionally, a given external service may require the identification of clients that are able to mount and/or export data using the external service.

In some embodiments, default values may be utilized in the configuration data if a user or administrator does not provide values. For example, if an administrator fails to identify a security method within configuration data for an external service, then by default no security may be applied to exports using that external service.

Finally, at operation 406, a clustered file system is extended with the service-specific interface. As used herein, a clustered file system may include any file system that is simultaneously mounted by multiple services and/or nodes. Examples of commercial clustered file systems include: Lustre, Oracle Cluster File System, Veritas Cluster File System, and GlusterFS (Linux). Further, the clustered file system may spread the data stored within the file system across multiple servers or storage nodes for purposes of redundancy and/or performance.

In various embodiments, a service-specific interface may originate and maintain service configuration data for an external service with which it is associated. Further, the service-specific interface may propagate this service configuration data to one or more nodes of a cluster. For example, the service—specific interface may propagate this service configuration data to all nodes of a cluster running the service which is configured by configuration data. As a specific example, a SMB-specific interface may propagate SMB configuration date to all nodes of a cluster running SMB. In one embodiment, the service-specific interface may propagate this service configuration data in response to an event. The event may include any transition affecting the cluster, such as a recovery of a node.

In various embodiments, commands may be implemented in the clustered file system to allow users to add, remove, change, update, list, or otherwise manipulate service-specific configuration data. For example, commands may allow a user to add, change, update, remove, and list export definitions for an external service, such as NFS, SMB, OpenStack, etc. Further, list and change commands may allow the manipulation of basic configuration settings, such as export definition default values for an external service.

Figure 5:
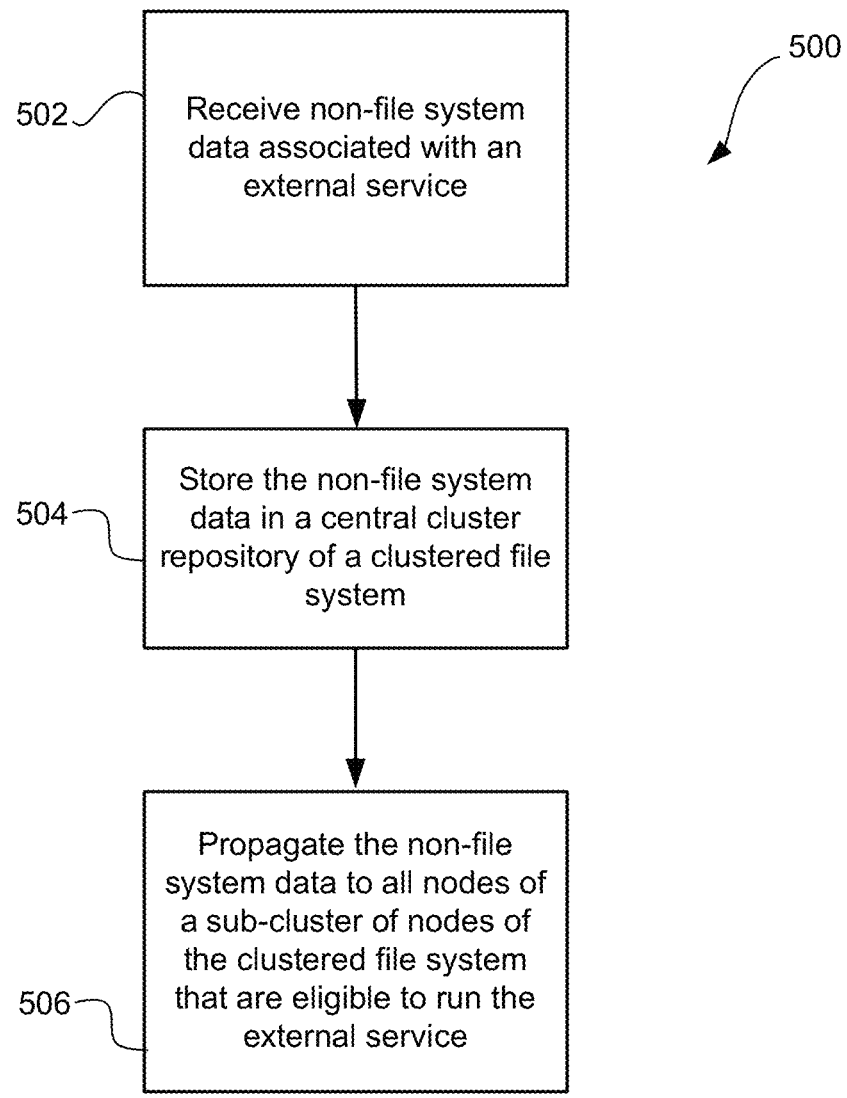
FIG. 5 illustrates a method for propagating data to nodes of a clustered file system, in accordance with another embodiment.

Now referring to FIG. 5, a flowchart of a method 500, for propagating data to nodes of a clustered file system, is shown according to one embodiment. The method 500 may be performed in accordance with the present invention in any of the environments depicted in FIGS. 1-3, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a data server or user device, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown, at operation 502, non-file system data is received. Further, the non-file system data is associated with an external service. As noted above, non-file system data may include configuration data, such as configuration data for one or more external services. The non-file system data may be received from a node, during a recovery, or during a restoration of a previous backup operation, etc., as will be described in more detail below.

Further, at operation 504, the non-file system data is stored in a central cluster repository of a clustered file system. Thus, configuration data for one or more external services may be stored in a central cluster repository of a clustered file system. After storing the non-file system data in the central central repository, the non-file system data may be backed up. In one embodiment, the received non-file system data may be backed up with the clustered file system. Further, in circumstances where the non-file system data has been backed up with the clustered file system, the non-file system data may be restored with the clustered file system in the event that the clustered file system is ever restored.

Still yet, at operation 506, the non-file system data is propagated to all nodes of a sub-cluster. Moreover, the nodes of the sub-cluster comprise all of the nodes of the clustered file system that are eligible to run the external service associated with the non-file system data. In on embodiment, the non-file system data may be propagated to the nodes of the sub-cluster by service-specific interfaces. Thus, the service-specific interfaces may activate new or changed configuration data on each node of the sub-cluster. In this manner, service-specific interfaces may be utilized to maintain service consistency throughout all nodes of a sub-cluster. Further, the non-file system data may not be propagated to nodes that are not members of the sub-cluster.

In some embodiments, the nodes of a cluster may be grouped into one or more sub-clusters. Further, the cluster may be configured such that only a given sub-cluster is eligible to run one or more external services. In one embodiment, the cluster may be configured such that only the nodes of a given sub-cluster are eligible to run any of the external services. The nodes of such a sub-cluster may include the nodes of the cluster that have external network access.

In a given configuration, a cluster may include only one node that is capable of supporting a particular external service. In another configuration, all of a plurality of nodes of a cluster may be capable of supporting the particular external service. In yet another configuration, a plurality of nodes of a cluster, or all the nodes of the cluster, may be capable of supporting one or more of the external services executing on the cluster. For example, all nodes of a sub-cluster may each concurrently support NFS and SMB services.

In one embodiment, the non-file system data received at operation 502 is received from a node of a cluster. In another embodiment, the non-file system data received at operation 502 may be received from a node of a cluster after the cluster is manually configured by a user, such as an administrative user. For example, after an administrator sets configuration data for an external service on a node of a cluster, the node forwards the configuration data so that it may be stored in the central cluster repository of a clustered file system, and so that it may be propagated to other nodes in the cluster that are running the external service.

In this manner, a user that wants to configure an external service, such as NFS, on a plurality of nodes, may easily ensure that all of the nodes are configured in the same manner. Consequently, the user may not need to configure each of the nodes separately. Further, if the user changes the configuration data for an external service on one of the nodes, the user may not need to re-configure each of the nodes separately.

In one embodiment, the central cluster repository may comprise a single location for storing configuration data for all external services operable on the cluster. In this way, all nodes of the cluster may be programmed to obtain/receive configuration data from the central cluster repository.

In various embodiments, the clustered file system may employ callbacks for notifying nodes of updates or changes to the non-file system data in the central cluster repository. As used herein, a callback may include any communication from the clustered file system that is provided to a node or external service to convey a state of the clustered file system. Further, a callback may provide a mechanism to invoke service-specific processing.

In one embodiment, the non-file system data is propagated using a callback. For example, propagating non-file system data to a sub-cluster of nodes that are eligible may include the clustered file system sending a callback. The callback may include, for example, an export add callback, an export update callback, an export change callback, indicating that an export of an external service has been added, updated, or changed, respectively, within the central cluster repository.

As another specific example, in response to receiving service-specific configuration data and/or storing the service-specific configuration data in the central cluster repository, the clustered file system may send an export update callback to the sub-cluster of nodes running the external service for which the service-specific configuration data is intended. The export update callback may notify any node receiving the callback that the export for a service has changed. Further, any node that receives the export update callback may, in response to receiving the export update callback, read configuration data for the external service that had its export modified, and then synch configuration data on the node to match the configuration data read from the central cluster repository. Thus, through use of such callbacks, identical configuration data may be maintained on all nodes of a cluster or sub-cluster, and the operation of such nodes may be synchronized.

In another embodiment, non-file system data may be propagated during a startup process to the nodes of the sub-cluster that are eligible to run the external service. In such an embodiment, for example, as a node of the cluster comes up, the node may identify an external service that is running on the node, or will be running on the node, read configuration data for the external service from the central cluster repository, and then synch configuration data on the node to match the configuration data read from the central cluster repository. Thus, for each external service running on the node, the node may retrieve the appropriate configuration data from the central cluster repository. In this manner, rather than store an instance of service configuration data on each node, when that configuration data can quickly go stale or become out of synch with the configuration data of other nodes, each node reads the same instance of up-to-date configuration data from the central cluster repository of the clustered file system, and the operation of such nodes may be synchronized.

In one embodiment, as a node starts and joins a cluster, the node may identify, using information stored in the central cluster repository, one or more IP addresses that it will export for the cluster. In such an embodiment, the cluster may include servers that offer services to clients, and the clients access the services by connecting to one or more IP addresses that are exported by nodes of the cluster. The clients may connect directly to the servers themselves, or the clients may connect to nodes via external services. Further, nodes of the cluster may be responsible for exporting the IP addresses for external access by various clients.

In one embodiment, the central cluster repository may track cluster-wide the distribution of exported IP addresses. Accordingly, when a node is recovering from previous crash, or when a node has crashed and one or more other nodes are taking over for the node that has crashed, the recovering node or the nodes taking over for the node that has crashed may utilize the central cluster repository to identify an IP address that was being exported by the node that crashed. The recovering node, or the nodes taking over for the node that has crashed, may then assist recovery by exporting services on the identified IP address.

In various embodiments, the storage of non-file system data in a central cluster repository may allow for more rapid disaster recovery. For example, if the central cluster repository is backed up during regularly scheduled backup operations of the clustered file system, then the non-file system data, including the configuration data, will be backed up with the clustered file system. In this way, the clustered file system and the configuration data for the external services may be treated as a whole. During a subsequent recovery of the clustered file system, nodes of the cluster may be able to retrieve configuration data from the central cluster repository as soon as the central cluster repository has been restored, and shortly thereafter begin exporting services. For example, after the central cluster repository has been restored from a backup, as the nodes of a sub-cluster that exports services are started, the nodes may invoke service start functions to read configuration data from the central cluster repository.

In this manner, an administrator does not need to locate and restore separate backups of the clustered file system and each of the external services that were previously running. Further, because for each service there is an instance of configuration data existing in the central cluster repository that all nodes running the service may be configured based on, the administrator does not need to manually ensure that service configurations match between nodes.

Figure 6:
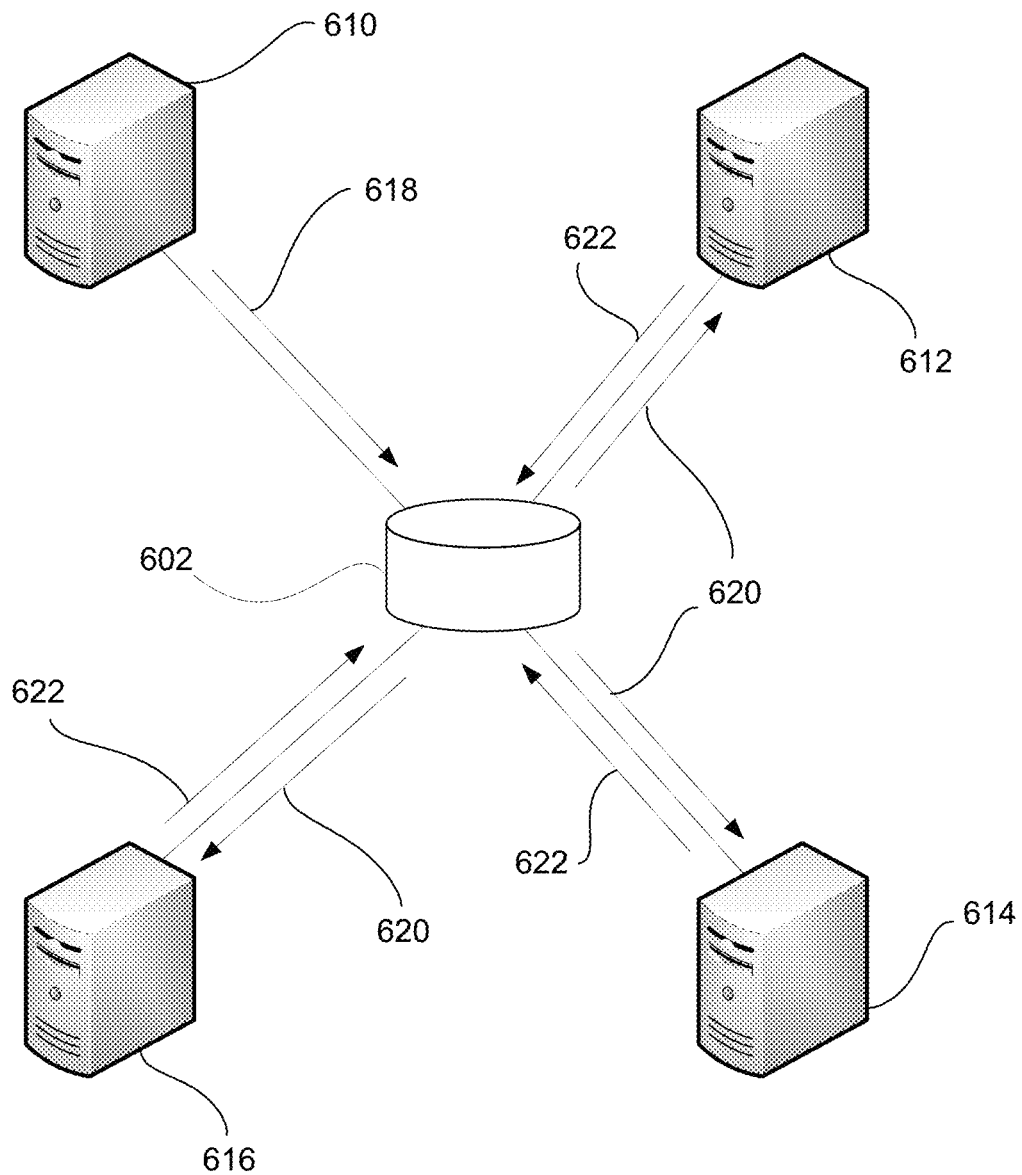
FIG. 6 illustrates cluster synchronizing a new service export, according to one embodiment.

FIG. 6 depicts a cluster 600 synchronizing a new service export, in accordance with one embodiment. As an option, the present cluster 600 may be implemented in conjunction with features from any other embodiment listed herein, such as those described with reference to the other FIGS. Of course, however, such cluster 600 and others presented herein may be used in various applications and/or in permutations which may or may not be specifically described in the illustrative embodiments listed herein. Further, the cluster 600 presented herein may be used in any desired environment.

As illustrated in FIG. 6, the cluster 600 is shown to include a clustered file system 602, and nodes 610-616. Moreover, the cluster 600 is shown synchronizing a new service export that has been created at node 610. More specifically, in response to a new service export being created at the node 610, the node 610 provides a communication 618 to a central cluster repository of the clustered file system 602. The new service export may be created at the node 610 by a user, such as an administrator. Further, the communication 618 may include a contents of the new service export created at the node 610. The service export may be for any external service, such as those described hereinabove. For example, an administrator may create a new NFS export by executing a clustered file system command for creating the new NFS export. Similarly, the administrator may create a new SMB export by executing a clustered file system command for creating the new SMB export. Such commands may be receiving using, for example, a command interface or graphical user interface.

Within the communication 618 from the node 610, the clustered file system 602 receives non-file system data associated with an external service. Further, the clustered file system stores the non-file system data in a central cluster repository of the clustered file system 602. For example, if an administrator has created a new NFS export, and the new NFS export is included in the communication 618, then the NFS configuration data stored in the central cluster repository of the clustered file system 602 is updated to include the new NFS export.

After storing the non-file system data in the central cluster repository of the clustered file system 602, callbacks 620 are used to propagate the non-file system data to eligible nodes of the cluster 600. For example, if the non-file system data includes configuration data for NFS services, then all nodes exporting NFS services may receive a callback 620. As shown, each of the nodes 612-616 receive a callback 620 from the clustered file system 602, the callback 620 indicating that configuration data for an external service has been updated. In one embodiment, each of the callbacks 620 may indicate that a new NFS export has been created. In another embodiment, each of the callbacks 620 may simply indicate that the NFS configuration data on the clustered file system 602 has been updated. Further, the callbacks 620 may be provided through a service-specific interface, such as an NFS-specific interface. Each of the callbacks 620 may comprise a configuration change function.

Moreover, in response to receiving the callbacks 620, each of the nodes 612, 614, and 616 access 622 the central cluster repository of the clustered file system 602 to retrieve the updated configuration data. In particular, via the accesses 622 of the central cluster repository, each of the nodes 612, 614, and 616 may retrieve NFS configuration data that includes the new NFS export originally created at the node 610 by the administrator. Each of the accesses 622 may occur over a service-specific interface. In one embodiment, a change function at each of the nodes 612-616 may read a file at the central cluster repository that stores the NFS export created at the node 610. Further, after obtaining the updated service configuration data, the change function may invoke one or more service notifications, such as a signal or a restart, to implement the updated configuration data at the respective node. In this manner, service configuration data utilized by the nodes 612-616 is updated and synchronized with the central cluster repository without any direct user or administrator actions.

Although the cluster 600 has been described above to be depicting the creation of a new service export, it is understood that the configuration of cluster 600 depicted in FIG. 6 could be similarly applicable for updating exports, changing exports, or removing or deleting exports, etc. Further, although specific examples have been provided in which the cluster 600 creates a new NFS export, it is understood that any update, change, remove, or delete, etc. operations could equally apply to other external services, such as SMB, OpenStack, iSCSI, etc.

The description provided above provides a way of integrating a clustered file system with the configuration of external services exported by nodes of a cluster. Such integration may alleviate administrative burdens, as well as avoid state mismatches and ensure consistency between nodes. Further, such integration, through use of a central cluster repository and backups of the central cluster repository, may allow for the rapid recovery and restoration of a cluster in the event of a failure of the cluster or the clustered file system.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product for extending a clustered file system, the computer program product comprising a computer readable storage medium having program instructions embodied therewith, the program instructions executable by a processor to cause the processor to:
   build, by the processor, a central cluster repository that stores configuration data for an external service, where:
      the external service allows devices that are not members of the clustered file system to manipulate data in the clustered file system;
   establish, by the processor, a service-specific interface for accessing the configuration data in the central cluster repository;
   identify, by the processor, a sending of updated configuration data for the external service from a node to the central cluster repository, utilizing the service-specific interface, the updated configuration data including:
      an identification of files to be exported by the external service,
      a number of threads the external service may use within the clustered file system,
      an identification of a security method that is applied during access of the clustered file system using the external service, and
      an identification of clients that are able to mount and export data using the external service;
   determine, by the processor, a sub-cluster of all nodes of the clustered file system running the external service,
   send, by the processor utilizing the service-specific interface, a callback to all determined nodes of the sub-cluster, the callback including an indication that the configuration data for the external service has been updated at the central cluster repository;
   provide, by the processor to all determined nodes of the sub-cluster in response to the callback, the updated configuration data from the central cluster repository, utilizing the service-specific interface;
   create, by the processor, a backup of the central cluster repository, including the updated configuration data for the external service;
   identify, by the processor, a recovery of the clustered file system;
   restore, by the processor, the central cluster repository, utilizing the backup; and
   provide, by the processor to all determined nodes of the sub-cluster, the updated configuration data from the restored central cluster repository.

2. The computer program product as recited in claim 1, wherein the service-specific interface includes a Network File System (NFS)-specific interface.

3. The computer program product as recited in claim 1, wherein the program instructions are further executable by the processor to cause the processor to:
   identify a startup of a second node running the external service; and
   send another callback to the second node, in response to the identification.

4. The computer program product as recited in claim 1, wherein the program instructions are further executable by the processor to cause the processor to:
  identify, by the processor, a receipt of new configuration data created for a second external service at the central cluster repository;
  determine, by the processor, a second sub-cluster of all nodes of the clustered file system running the second external service;
  send, by the processor and utilizing an interface specific to the second external service, a callback to all determined nodes of the second sub-cluster, the callback including an indication that new configuration data for the second external service is available at the central cluster repository;
  provide, by the processor to all determined nodes of the second sub-cluster in response to the callback, the new configuration data from the central cluster repository, utilizing the interface specific to the second external service;
  identify, by the processor, a startup of a second node running the external service;
  send, by the processor utilizing the service-specific interface, a second callback to the second node, in response to the identification of the startup of the second node running the external service; and
  provide, by the processor to the second node in response to the second callback, the updated configuration data from the central cluster repository, utilizing the service-specific interface.

5. A computer program product for propagating non-file system data, the computer program product comprising a computer readable storage medium having program instructions embodied therewith, the program instructions executable by a processor to cause the processor to:
  receive, by the processor utilizing a service-specific interface, updated configuration data for an external service from a node of a clustered file system, where:
    the external service allows devices that are not members of the clustered file system to manipulate data in the clustered file system, and
    the updated configuration data includes:
      an identification of files to be exported by the external service,
      a number of threads the external service may use within the clustered file system,
      an identification of a security method that is applied during access of the clustered file system using the external service, and
      an identification of clients that are able to mount and export data using the external service;
  store, by the processor, the updated configuration data in a central cluster repository of the clustered file system;
  determine, by the processor, a sub-cluster of all nodes of the clustered file system that are running the external service,
  send, by the processor and utilizing the service-specific interface, a callback to all determined nodes of the sub-cluster, the callback including an indication that configuration data for the external service has been updated at the central cluster repository;
  provide, by the processor to all determined nodes of the sub-cluster in response to the callback, the updated configuration data from the central cluster repository, utilizing the service-specific interface;
  create, by the processor, a backup of the central cluster repository, including the updated configuration data for the external service;
  identify, by the processor, a recovery of the clustered file system;
  restore, by the processor, the central cluster repository, utilizing the backup; and
  provide, by the processor to all determined nodes of the sub-cluster, the updated configuration data from the restored central cluster repository.

6. The computer program product as recited in claim 5, wherein the service-specific interface includes a Network File System (NFS)-specific interface.

7. The computer program product as recited in claim 1, wherein the updated configuration data includes contents of a new service export created at the node of the sub-cluster.

8. The computer program product as recited in claim 1, wherein:
  the updated configuration data includes a new network file system (NFS) export that includes configuration data for NFS services,
  the sub-cluster of all nodes includes all nodes exporting NFS services,
  the callback to all nodes of the sub-cluster of all nodes includes an indication that the new NFS export has been created, and
  the service-specific interface includes an NFS-specific interface.

9. The computer program product as recited in claim 1, wherein the callback includes an export update callback that notifies each of the sub-cluster of all nodes that an export for the external service has changed.

10. The computer program product as recited in claim 1, wherein the program instructions are further executable by the processor to cause the processor to:
  identify a startup of a second node running the external service; and
  send a second callback to the second node, in response to the identification;
  wherein the updated configuration data includes a new network file system (NFS) export that includes configuration data for NFS services;
  wherein the callback to all nodes of the sub-cluster of all nodes includes an indication that the new NFS export has been created.

11. The computer program product as recited in claim 5, wherein the updated configuration data is restored with the clustered file system from a backup of the clustered file system.

12. The computer program product as recited in claim 5, wherein the callback indicates that the updated configuration data has been stored in the central cluster repository.

13. A system, comprising:
  a processor; and
  logic integrated with the processor, executable by the processor, or integrated with and executable by the processor, the logic being configured to cause the processor to:
  receive, utilizing a service-specific interface, updated configuration data for an external service from a node of a clustered file system, where:
    the external service allows devices that are not members of the clustered file system to manipulate data in the clustered file system, and
    the updated configuration data includes:
      an identification of files to be exported by the external service, a number of threads the external service may use within the clustered file system, an identification of a security method that is applied during access of the clustered file system using the external service, and an identification of clients that are able to mount and export data using the external service;

store the updated configuration data in a central cluster repository of the clustered file system;

determine a sub-cluster of all nodes of the clustered file system that are running the external service, send, utilizing the service-specific interface, a callback to all determined nodes of the sub-cluster, the callback including an indication that configuration data for the external service has been updated at the central cluster repository;

provide, to all determined nodes of the sub-cluster in response to the callback, the updated configuration data from the central cluster repository, utilizing the service-specific interface;

create a backup of the central cluster repository, including the updated configuration data for the external service;

identify a recovery of the clustered file system;

restore the central cluster repository, utilizing the backup; and provide, to all determined nodes of the sub-cluster, the updated configuration data from the restored central cluster repository.

14. The system as recited in claim 13, wherein the service-specific interface includes a Network File System (NFS)-specific interface.

15. The system as recited in claim 13, wherein the logic is further configured to:

identify a startup of a second node running the external service; and send a second callback to the second node, in response to the identification.

16. The system as recited in claim 13, wherein the external service includes a process external to the clustered file system that allows devices that are not members of the clustered file system to manipulate data in the clustered file system.

* * * * *